US012471157B2

(12) United States Patent
Rajput et al.

(10) Patent No.: US 12,471,157 B2
(45) Date of Patent: Nov. 11, 2025

(54) X2GW MULTI-CELL SUPPORT

(71) Applicant: Parallel Wireless, Inc., Nashua, NH (US)

(72) Inventors: Mahendra Singh Rajput, Bangalore (IN); Shivani Mehrotra, Nashua, NH (US); Chirag Makwana, Pune (IN); Salil Sahasrabudhe, Pune (IN); Pradeep Sachdeva, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 575 days.

(21) Appl. No.: 17/861,654

(22) Filed: Jul. 11, 2022

(65) Prior Publication Data

US 2023/0008393 A1 Jan. 12, 2023

Related U.S. Application Data

(60) Provisional application No. 63/219,879, filed on Jul. 9, 2021.

(51) Int. Cl.
*H04W 76/12* (2018.01)
*H04W 88/16* (2009.01)

(52) U.S. Cl.
CPC ............ *H04W 76/12* (2018.02); *H04W 88/16* (2013.01)

(58) Field of Classification Search
None
See application file for complete search history.

(56) References Cited

U.S. PATENT DOCUMENTS

| 2018/0035334 | A1* | 2/2018 | Lohar | H04W 36/0066 |
| 2022/0141921 | A1* | 5/2022 | Balasubramanian | H04W 84/045 370/328 |

FOREIGN PATENT DOCUMENTS

WO   WO-2019209922 A1 * 10/2019 ......... H04L 61/2528

OTHER PUBLICATIONS

LTE; Evolved Universal Terrestrial Radio Access Network (E-UTRAN); S1 Application Protocol (S1AP) (3GPP TS 36.413 version 15.3.0 Release 15), Sep. 2018.
LTE; Evolved Universal Terrestrial Radio Access Network (E-UTRAN); X2 Application Protocol (X2AP) (3GPP TS 36.423 version 12.3.0 Release 12), Sep. 2014.

* cited by examiner

*Primary Examiner* — Robert M Morlan
(74) *Attorney, Agent, or Firm* — Michael Y. Saji (57) ABSTRACT

A method, computer readable media and system for providing X2 Gateway (GW) multi-cell support, comprising: are presented. In one embodiment a method includes providing a system having a Virtual Radio Unit (VRU) in communication with a Het Net Gateway (coordinating server); exchanging non-content X2 request messages between the VRU and the coordinating server; exchanging non-content X2 response messages between the VRU and the coordinating server; and wherein the non-content X2 request messages and the X2 response messages are used to communicate multiple cells served by the VRU to the coordinating server.

20 Claims, 9 Drawing Sheets

X2GW MULTI-CELL SUPPORT

CROSS-REFERENCE TO RELATED APPLICATIONS

This application claims priority under 35 U.S.C. § 119(e) to U.S. Provisional Pat. App. No. 63/219,879, filed Jul. 9, 2021, titled "X2GW Multi-Cell Support" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

PW-X2GW provides the intelligent mechanism for PW submacros and Home eNodeBs sharing the eNodeB-Id to connect on X2 interface by using star topology rather than mesh topology.

PW-4G-solution until now supported single cell based CWS or VRU-VNODE on VRU. To increase the capacity of VRU and to make it a carrier grade, now VRU shall support multiple cells per S1-VODE. We may have any combination of cells per VRU-VNODE on VRU and each VRU shall have multiple VRU-VNODEs orchestrated as virtualized containers on the same VRU.

With single cell support, X2GW used to get the cell information via UE Attach and S1 Handover messages. However, if VRU Node supports multiple cells, there is no way to update coordinating server about all the cells. Also, for the events like cells coming up or going down at VRU, there is no mechanism defined currently to update this information at coordinating server and hence to connected Macro eNodeBs. Also, a mechanism is needed to identify different VRU VNodes connected to the same virtual eNodeB(vEnB) and sharing the same 20-bit global eNodeBlds.

SUMMARY

A method, computer readable media and a system is disclosed to enhance coordinating server X2GW node to support 4G-VNODE on VRU supporting multiple carrier components (cells) per S1-peer. A system is disclosed to learn and maintain these served cell information per coordinating server subsystem for handling the S1-X2 handovers and X2 updates for these multi-cells based S1-peers.

In one embodiment a method providing X2 Gateway (GW) multi-cell support, includes providing a system having a Virtual Radio Unit (VRU) in communication with a Het Net Gateway (coordinating server); exchanging non-content X2 request messages between the VRU and the coordinating server; exchanging non-content X2 response messages between the VRU and the coordinating server; and wherein the non-content X2 request messages and the X2 response messages are used to communicate multiple cells served by the VRU to the coordinating server.

In another embodiment a non-transitory computer-readable medium contains instructions for providing X2 Gateway (GW) multi-cell support, when executed, cause the system to perform steps including providing a system having a Virtual Radio Unit (VRU) in communication with a Het Net Gateway (coordinating server); exchanging non-content X2 request messages between the VRU and the coordinating server; exchanging non-content X2 response messages between the VRU and the coordinating server; and wherein the non-content X2 request messages and the X2 response messages are used to communicate multiple cells served by the VRU to the coordinating server.

In another embodiment a system for providing X2 Gateway (GW) multi-cell support includes a Virtual Radio Unit (VRU) in communication with a Het Net Gateway (coordinating server); wherein non-content X2 request messages are exchanged between the VRU and the coordinating server; wherein non-content X2 response messages are exchanged between the VRU and the coordinating server; and wherein the non-content X2 request messages and the X2 response messages are used to communicate multiple cells served by the VRU to the coordinating server.

DETAILED DESCRIPTION

Figure 1:
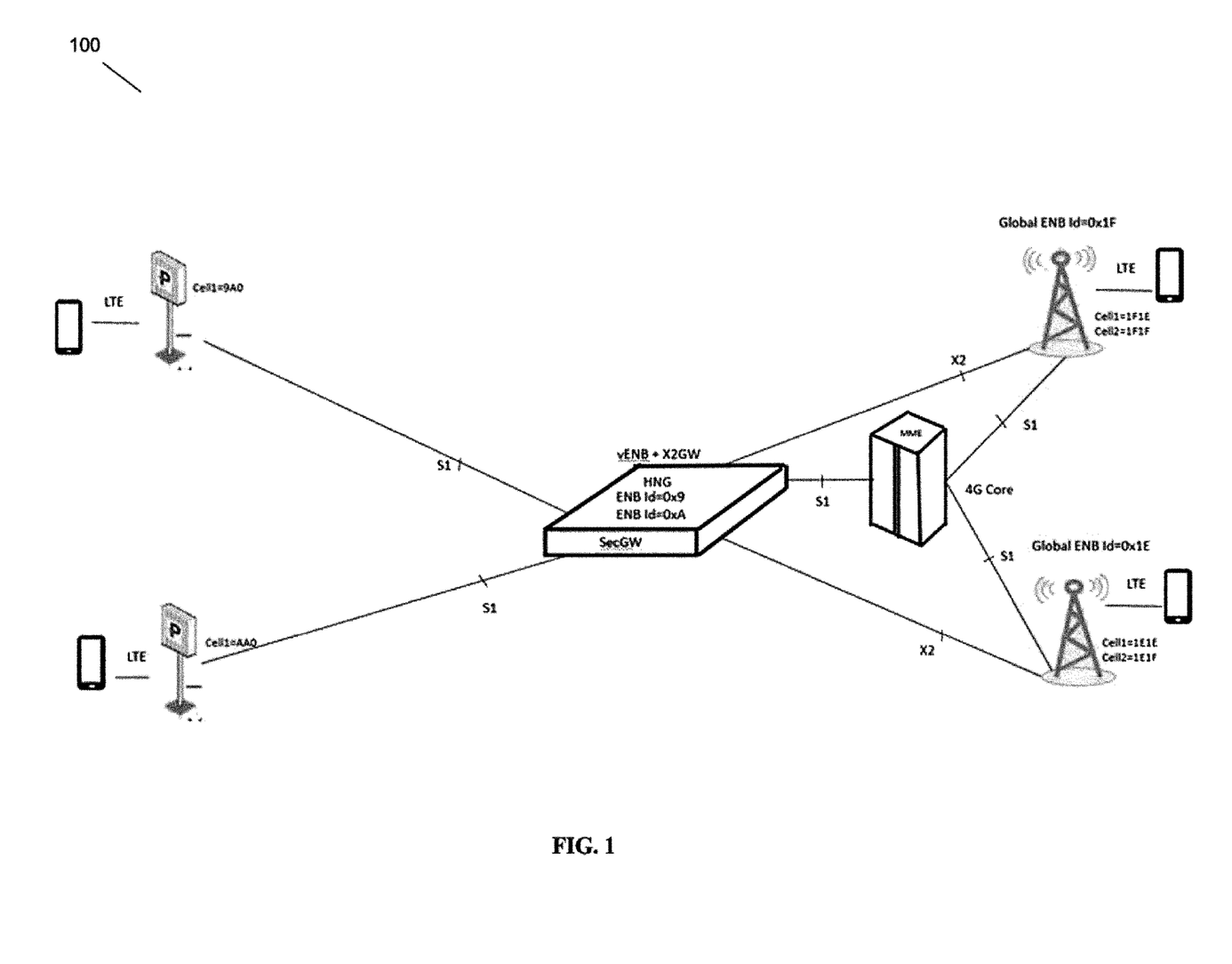
FIG. 1 is an architecture diagram, in accordance with some embodiments.

An architecture 100 is shown in the diagram of FIG. 1. It should be appreciated that the following description of may include X2 for 4G systems as well as Xx/Xn for 5G systems.

With coordinating server sitting on the edge of network talking directly to eNodeBs, X2GW has been developed on coordinating server to facilitate communication with eNodeBs on access and Core side over X2AP.

X2GW on coordinating server supports X2 Messaging between Inter/Intra-coordinating server VeNB; X2 Messaging between Access HeNB and Core Macro eNodeB; and X2 Messaging between CWS and coordinating server X2GW on coordinating server allows inter-operability between multi-vendor eNodeBs along with VeNB aggregation where 256 HeNB/CWS are virtualized as single VeNB towards Core network (MME)/Macro eNodeB.

The multi-cell support on VRU-VNODE on VRU shall require some mechanism on coordinating server to support the dependent functionalities. It should be appreciate that the VRU could be realized as a Centralized Unit (CU) and a Distributed Unit (DU) and/or a Remote Radio Head (RRH). Following are the major challenges for multi-cell support on coordinating server: identify a mechanism to exchange multi-cell info between VRU-VNode and coordinating server; learning of multi-Cell information parameters on coordinating server and associated maintenance, clean-up of UE-sessions, etc.; and association of multiple cells belonging to a specific VRU as a subset belonging to same 20-bit global eNodeB Id.

The presently described X2GW multi-cell support makes use of standard X2 interface to communicate multi-cell info between VRU-VNode and coordinating server.

According to this, X2 association shall be supported on the Access interface between coordinating server and VRU-VNode for information exchange over X2 links.

This interface shall use a non-content X2-setup request/response message for registration of multiple served cells belonging to a particular VRU-VNode.

X2 Registration of MultiCell submacro.

Figure 2:
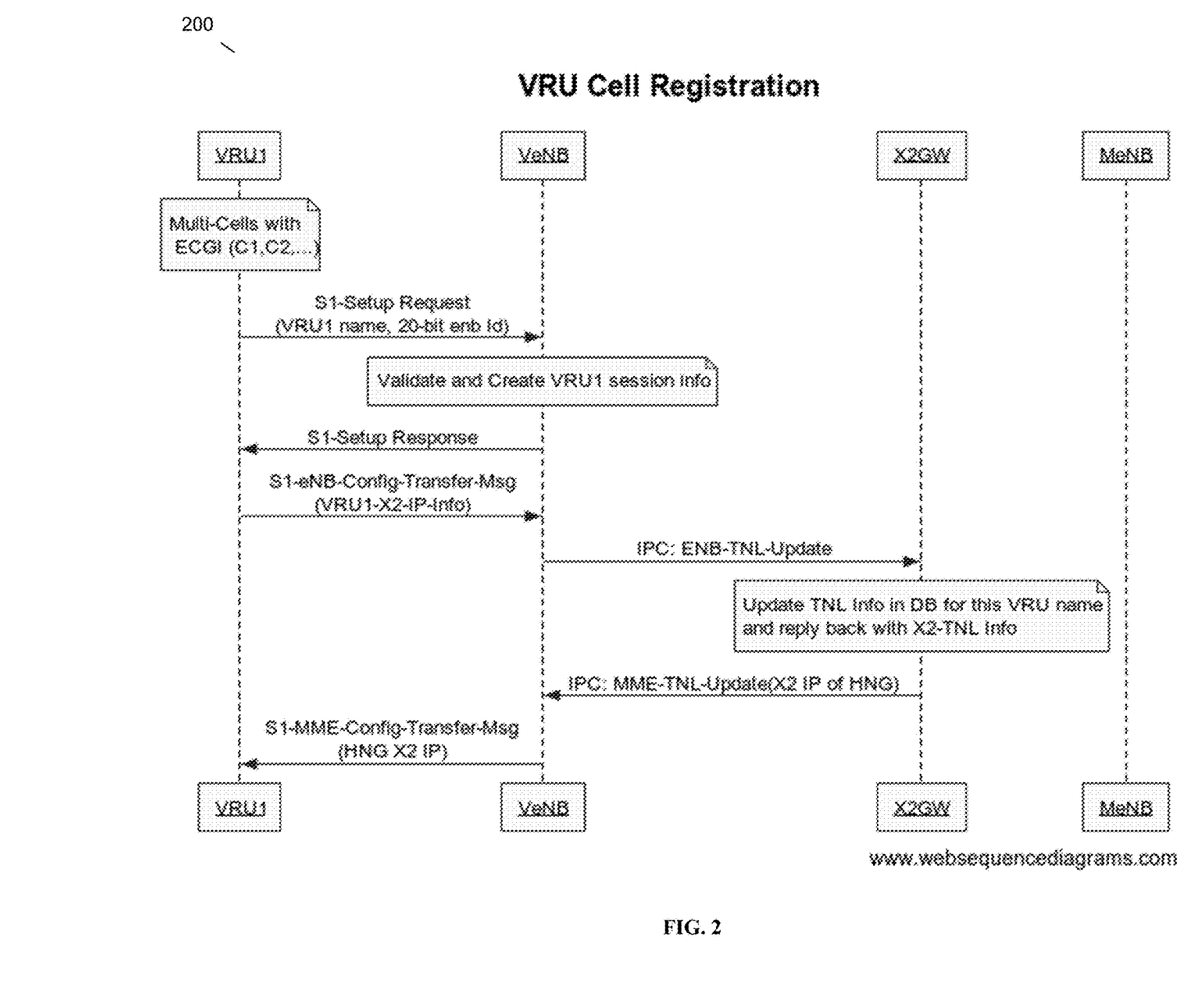
FIG. 2 is a call flow diagram for VRU call registration, in accordance with some embodiments.

Referring now to FIG. 2 a call flow 200 for VRU call registration is shown.

The TNL address from VRU-VNode shall be communicated via ENB configuration transfer message on S1 interface. The X2-IP from VRU-VNode will be sent via X2-TNL configuration info as part of extension container when SON configuration transfer refers to ifSONInformationRequest (1).

Figure 3:
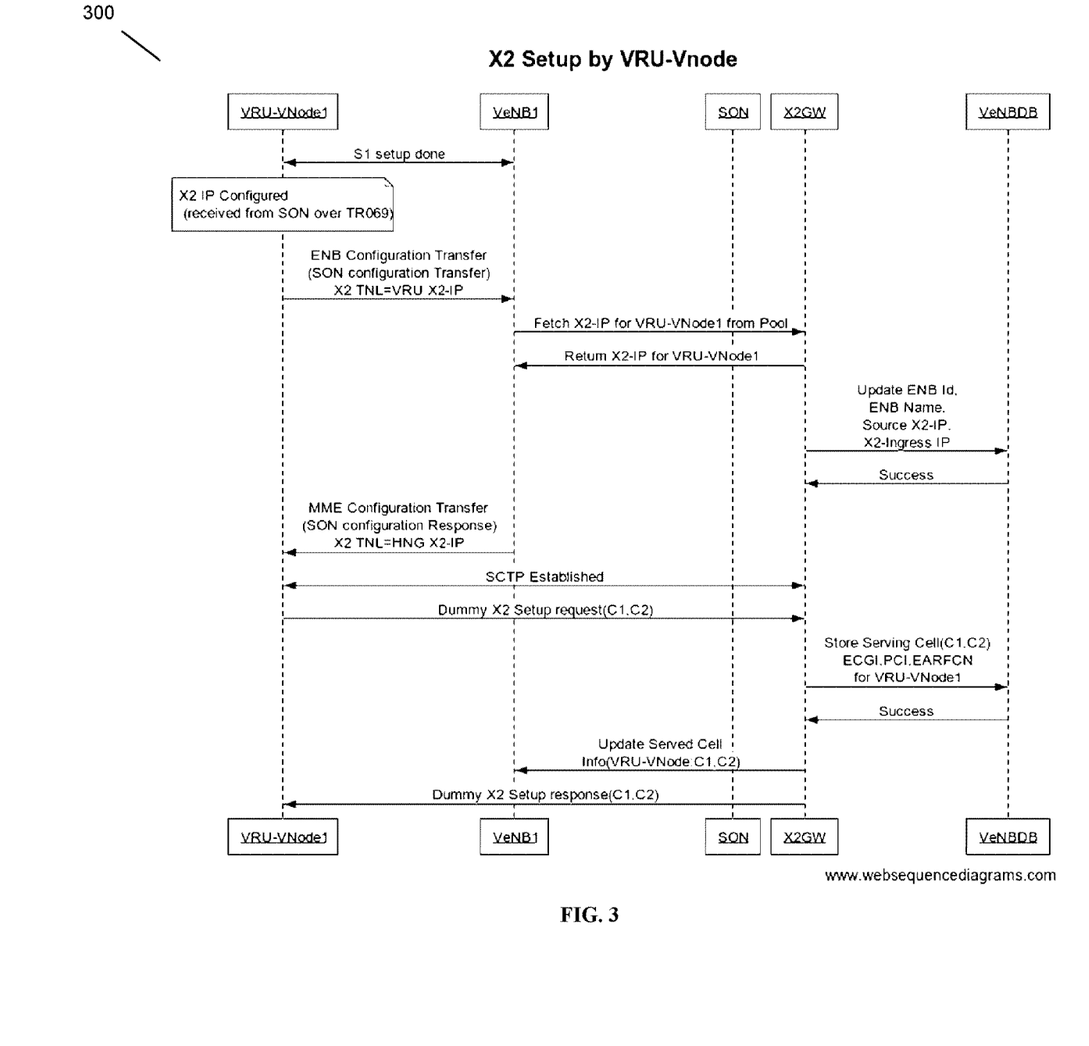
FIG. 3 is a VRU call flow registration, in accordance with some embodiments.

FIG. 3 shows a VRU call flow registration 300. Handling towards Access.

coordinating server shall receive X2 IP of VRU-VNode on S1 interface of VeNB along with VRU name. VeNB shall select the X2 Ingress Demux and update the peer X2 IP. X2 Ingress demux records the X2-IP received from VeNB and allocate the local IP from the configured x2-pool. It also creates a mapping of VRU name v/s X2-IP sent via peer. This helps in identifying all the cells belonging to a particular VRU-VNode for any future transaction.

The allocated IP shall be communicated back to VeNB internally. VeNB shall encode local IP inside SON configuration reply IE of MME-Configuration transfer message towards VRU-VNode.

When X2-Setup is received from the IP recorded earlier at X2-interface, coordinating server shall fetch the served cells from X2-Setup request and update VeNB as served cells currently belonging to VRU-VNode.

This is a non-content X2-setup request/response message being exchanged between VRU and coordinating server only to communicate multiple cells served by VRU to coordinating server.

Figure 4:
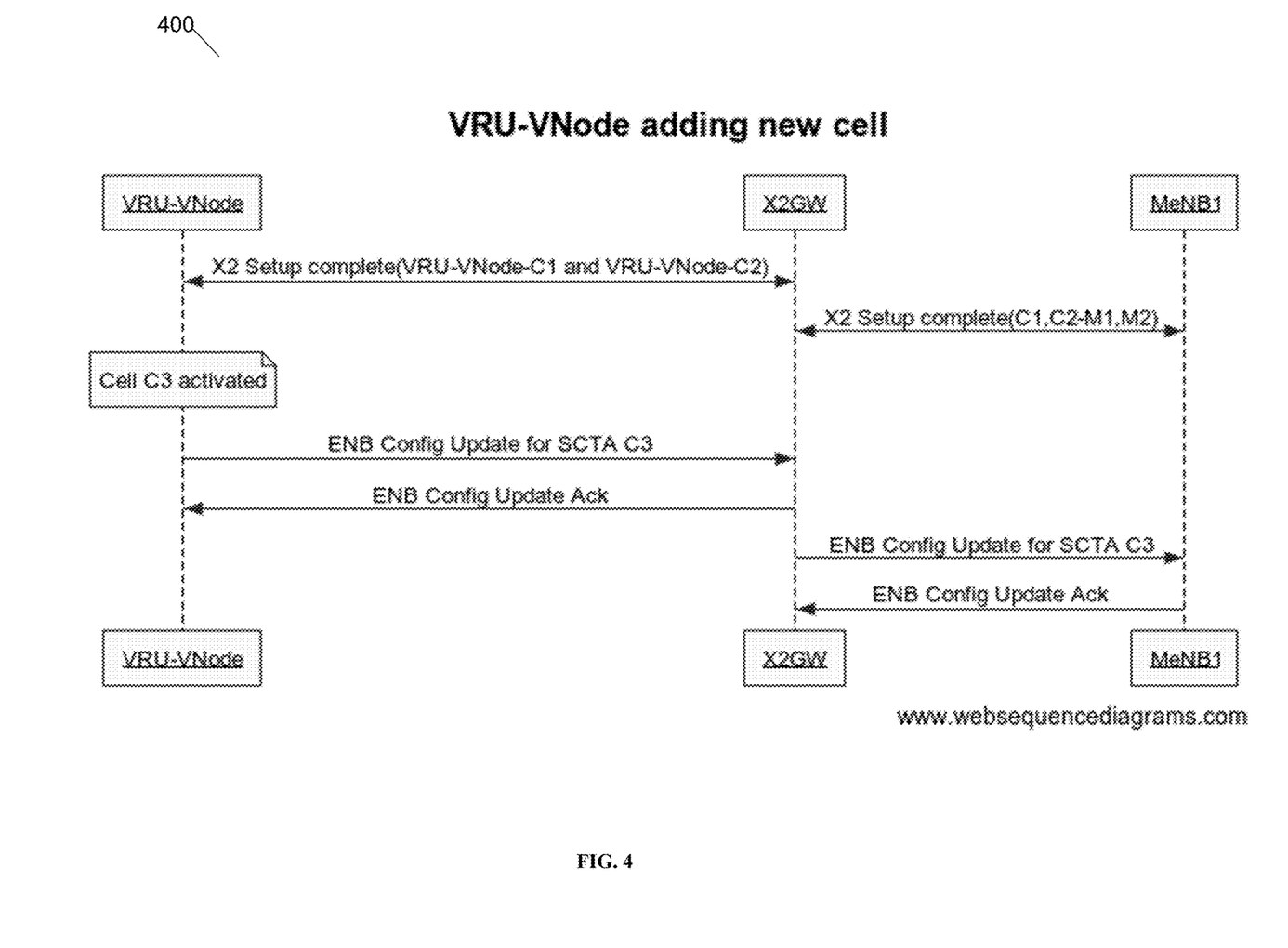
FIG. 4 is a a call flow diagram for a VRU-Vnode adding a new call, in accordance with some embodiments.

FIG. 4 shows a call flow 400 for a VRU-Vnode adding a new call. When ENB config update is received from VRU-VNode for served cells to be added/deleted, X2GW shall update VeNB regarding the same. X2GW shall update the VeNBDB and applicable egress interfaces/peers with cell update.

VRU-VNode Enabling New Cell

After X2 setup is done, VRU-VNode shall update addition of served cell using X2 eNodeB configuration update. Any Macro eNB which is connected to existing cell of this VRU-VNode shall be updated with the new cell being added using X2 eNodeB configuration update message.

Figure 5:
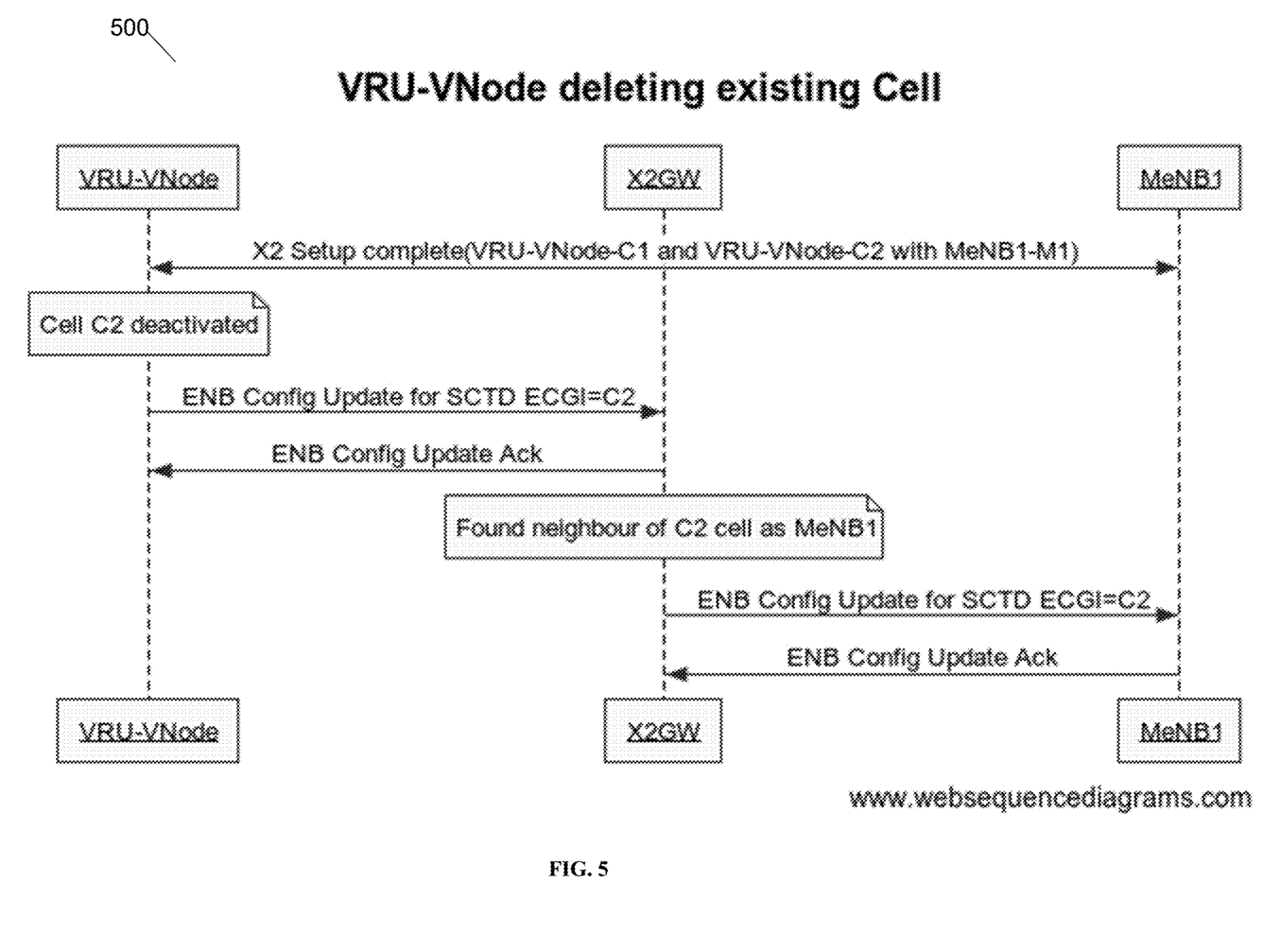
FIG. 5 is a diagram of a call flow for a VRU-Vnode deleting an exisiting call, in accordance with some embodiments.

FIG. 5 shows a call flow 500 for a VRU-Vnode deleting an exisiting call.

VRU-VNode Delete Existing Cell

After X2 setup is done, VRU-VNode shall delete served cell using X2 eNodeB configuration update. Any Macro eNB which is connected to existing cell of this VRU-VNode shall be updated with the cell to be deleted using X2 eNodeB configuration update message.

Handling Towards Core

Cell info shall be preserved at VeNBDB task when X2 Setup from VRU-VNode is received. When TNL is received from MeNB or TNL is sent towards MeNB, the Egress IP is allocated, if not done, for X2VeNB. The current cell info for X2VeNB is pulled from DB and used to create X2 endpoint to communicate with the peer node.

Architecture Diagram

Figure 6:
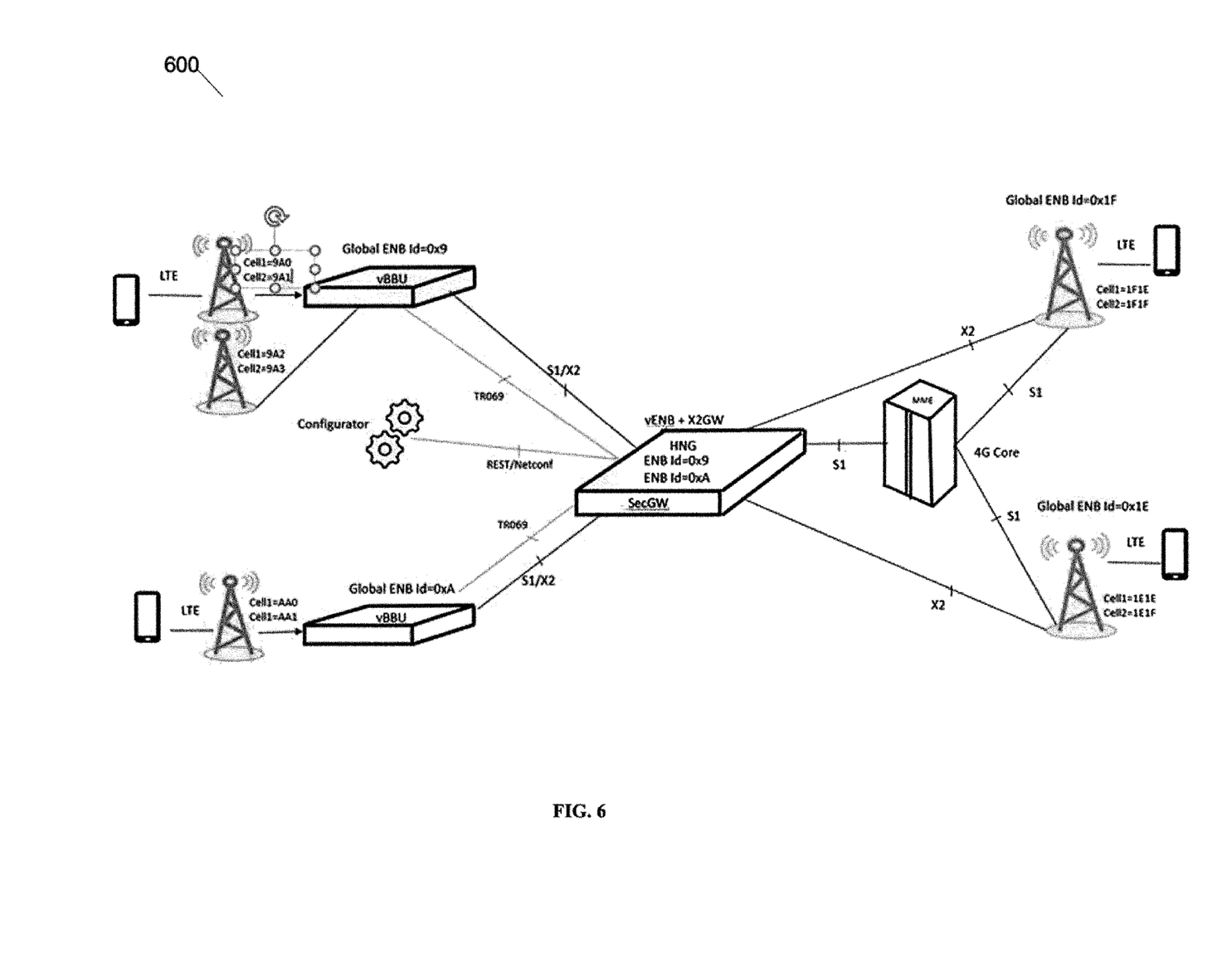
FIG. 6 is a diagram of an architecture with multicell VRUs, in accordance with some embodiments.

The architecture 600 with multicell VRUs is explained below in relation to FIG. 6. Each VRU-VNode shall use unique ENodeB-name during S1-Setup procedure. Each multi-cell VRU-VNODE shall support both S1 and X2 so that coordinating server could learn the served cell information as part of X2. SCTP association at X2 interface shall be single homed with IPv4 address. VRU-VNODE must include only one IP in TNL request. S1 and X2 links shall always remain coordinated. VRU-VNODE shall perform X2 Link down when S1 down is detected/done. Any Change in Peer X2 IP at VRU-VNode must bring down X2 link and TNL shall be sent again.

Figure 7:
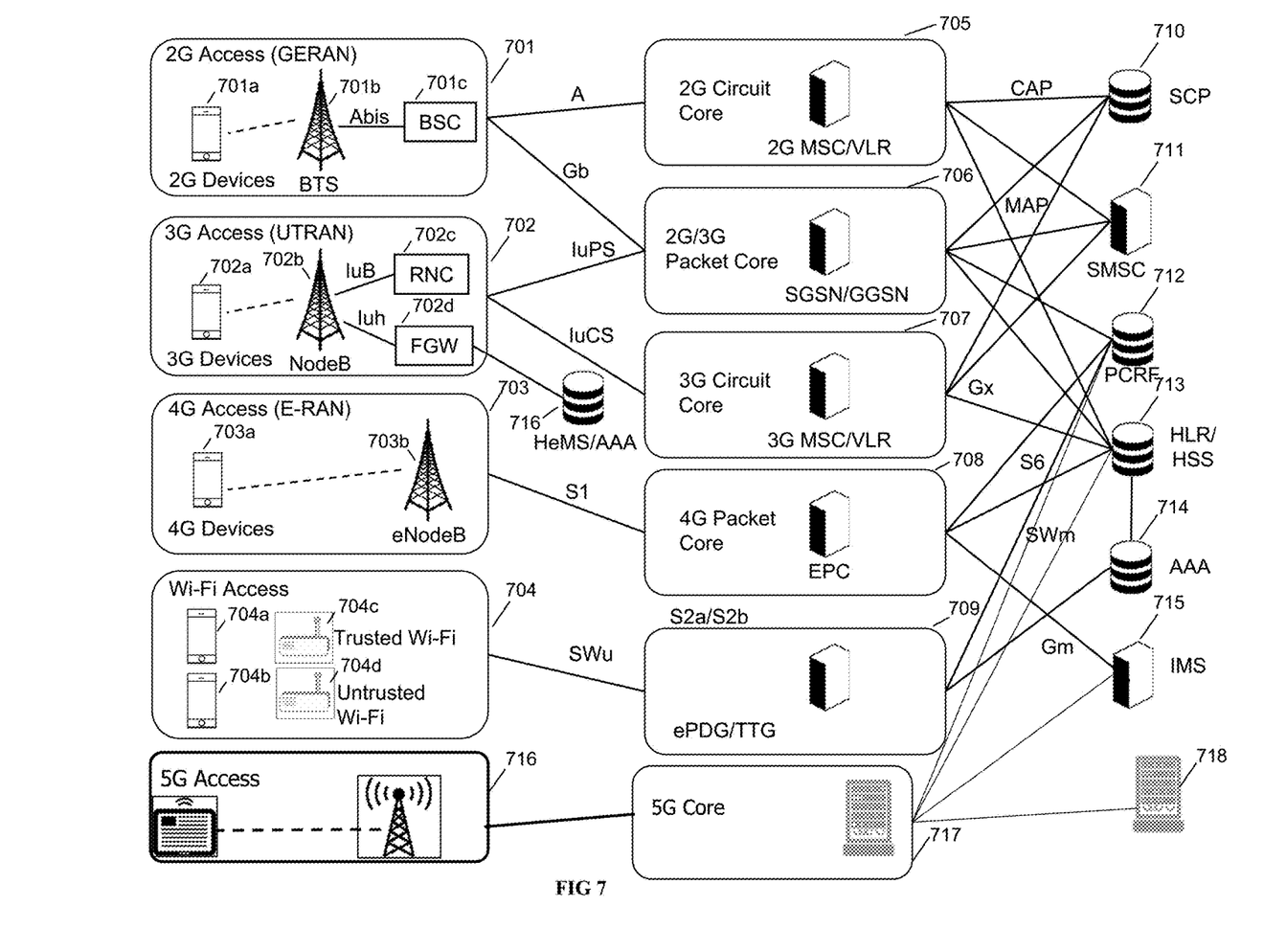
FIG. 7 is a schematic network architecture diagram for 3G and other-G prior art networks.

FIG. 7 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 701a, BTS 701b, and BSC 701c. 3G is represented by UTRAN 702, which includes a 3G UE 702a, nodeB 702b, RNC 702c, and femto gateway (FGW, which in 3GPP namespace is also known as a Home nodeB Gateway or HNBGW) 702d. 4G is represented by EUTRAN or E-RAN 703, which includes an LTE UE 703a and LTE eNodeB 703*b*. Wi-Fi is represented by Wi-Fi access network 704, which includes a trusted Wi-Fi access point 704*c* and an untrusted Wi-Fi access point 704*d*. The Wi-Fi devices 704*a* and 704*b* may access either AP 704*c* or 704*d*. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701*c* is required for Abis compatibility with BTS 701*b*, while for the 3G UTRAN, an RNC 702*c* is required for Iub compatibility and an FGW 702*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. The present invention is also applicable for 5G networks since the same or equivalent functions are available in 5G. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
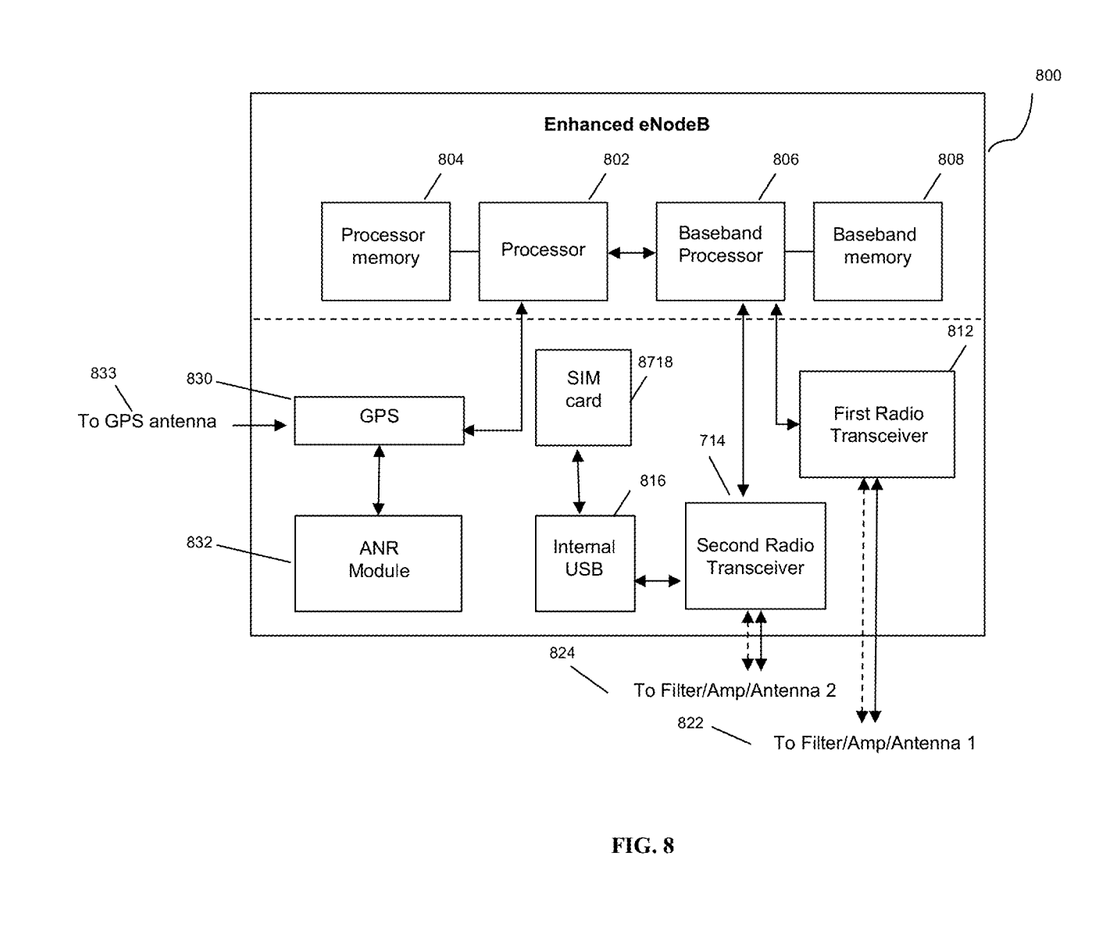
FIG. 8 is an enhanced eNodeB for performing the methods described herein, in accordance with some embodiments.

FIG. 8 is an enhanced eNodeB for performing the methods described herein, in accordance with some embodiments. eNodeB 500 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 9:
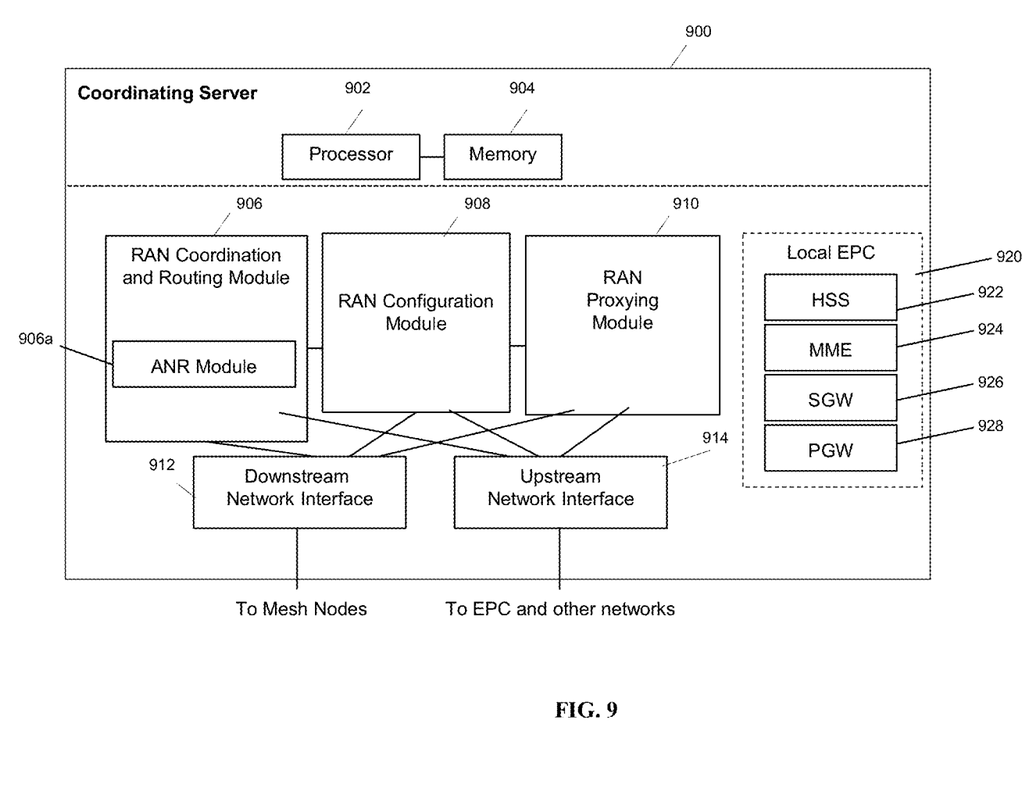
FIG. 9 is a coordinating server for providing services and performing methods as described herein, in accordance with some embodiments.

FIG. 9 is a coordinating server for providing services and performing methods as described herein, in accordance with some embodiments. Coordinating server 900 includes processor 902 and memory 904, which are configured to provide the functions described herein. Also present are radio access network coordination/routing (RAN Coordination and routing) module 906, including ANR module 906a, RAN configuration module 908, and RAN proxying module 910. The ANR module 906a may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders, as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for providing X2 Gateway (GW) multi-cell support, comprising:
   providing a system having a Virtual Radio Unit (VRU) in communication with a coordinating server;
   exchanging non-content X2 request messages between the VRU and the coordinating server; exchanging non-content X2 response messages between the VRU and the coordinating server; and
   wherein the non-content X2 request messages and the X2 response messages are used to communicate multiple cells served by the VRU to the coordinating server.

2. The method of claim 1 further comprising wherein the messages are used to provide X2 setup by the VRU.

3. The method of claim 1 further comprising wherein the messages are used to add a new call.

4. The method of claim 1 further comprising wherein the messages are used to delete an existing call.

5. The method of claim 1 wherein exchanging non-content X2 request messages between the VRU and the coordinating server further comprises storing a serving cell for the VRU at a Virtual eNodeB data base (VeNBDB).

6. The method of claim 5 further comprising updating served cell information for the VRU at a Virtual eNodeB (VeNB).

7. The method of claim 1 wherein the VRU comprises a Centralized Unit (CU) and a Distributed Unit (DU), or a Remote Radio Head (RRH).

8. A non-transitory computer-readable medium containing instructions for providing X2 Gateway (GW) multi-cell support, when executed, cause the system to perform steps comprising:
   providing a system having a Virtual Radio Unit (VRU) in communication with a coordinating server;
   exchanging non-content X2 request messages between the VRU and the coordinating server; exchanging non-content X2 response messages between the VRU and the coordinating server; and
   wherein the non-content X2 request messages and the X2 response messages are used to communicate multiple cells served by the VRU to the coordinating server.

9. The non-transitory computer-readable medium of claim 8 further comprising instructions wherein the messages are used to provide X2 setup by the VRU.

10. The non-transitory computer-readable medium of claim 8 further comprising instructions wherein the messages are used to add a new call.

11. The non-transitory computer-readable medium of claim 8 further comprising instructions wherein the messages are used to delete an existing call.

12. The non-transitory computer-readable medium of claim 8 further comprising instructions wherein exchanging non-content X2 request messages between the VRU and the coordinating server further comprises storing a serving cell for the VRU at a Virtual eNodeB data base (VeNBDB).

13. The non-transitory computer-readable medium of claim 12 further comprising instructions for updating served cell information for the VRU at a Virtual eNodeB (VeNB).

14. The non-transitory computer-readable medium of claim 8 wherein the VRU comprises a Centralized Unit (CU) and a Distributed Unit (DU), or a Remote Radio Head (RRH).

15. A system providing X2 Gateway (GW) multi-cell support, comprising:
 a Virtual Radio Unit (VRU) in communication with a Het Net Gateway (coordinating server);
 wherein non-content X2 request messages are exchanged between the VRU and the coordinating server;
 wherein non-content X2 response messages are exchanged between the VRU and the coordinating server; and
 wherein the non-content X2 request messages and the X2 response messages are used to communicate multiple cells served by the VRU to the coordinating server.

16. The system of claim 15 further comprising wherein the messages are used to provide X2 setup by the VRU.

17. The system of claim 15 further comprising wherein the messages are used to add a new call.

18. The system of claim 15 further comprising wherein the messages are used to delete an existing call.

19. The system of claim 15 wherein exchanging non-content X2 request messages between the VRU and the coordinating server wherein a serving cell for the VRU is stored at a Virtual eNodeB data base (VeNBDB).

20. The system of claim 19 wherein served cell information for the VRU is updated at a Virtual eNodeB (VeNB).

\* \* \* \* \*